United States Patent [19]

Weber et al.

[11] Patent Number: 5,507,150

[45] Date of Patent: Apr. 16, 1996

[54] EXPENDABLE LIQUID THERMAL MANAGEMENT SYSTEM

[75] Inventors: Richard M. Weber, Propser; Donald C. Price, Dallas; Byron E. Short, Jr., Fairview, all of Tex.

[73] Assignee: Texas Instruments Incorporated, Dallas, Tex.

[21] Appl. No.: 192,026

[22] Filed: Feb. 4, 1994

[51] Int. Cl.$^6$ ..................... F25B 19/00
[52] U.S. Cl. ............... 62/100; 62/169; 62/259.2
[58] Field of Search ............ 62/100, 268, 259.2, 62/169

[56] References Cited

U.S. PATENT DOCUMENTS

| | | | |
|---|---|---|---|
| 2,023,444 | 10/1935 | Roe | 62/100 |
| 2,925,722 | 2/1960 | Blackburn et al. | 62/100 X |
| 3,149,474 | 9/1964 | Goodman | 62/100 X |
| 3,680,327 | 8/1972 | Stein | 62/268 X |
| 5,209,078 | 5/1993 | Conrad et al. | 62/169 |

Primary Examiner—William E. Wayner
Attorney, Agent, or Firm—René E. Grossman; Richard L. Donaldson

[57] ABSTRACT

A thermal management system using an expendable liquid which undergoes phase change to a vapor as waste heat is absorbed and also possesses a high latent heat of vaporization. The vapor is expelled, carrying with it the waste heat. A vacuum source lowers the vapor pressure to lower the vaporization temperature. In first embodiments, regulated fluid flows into a heat exchanger wherein a vacuum system lowers the pressure. Waste heat transported to the heat exchanger by a coolant loop causes the liquid to boil at a desired temperature. A flow regulator controls the rate of fluid flow from the pressurized reservoir to the heat exchanger. The refrigeration effect is produced by the liquid being converted from the liquid to the vapor phase and absorbing heat from the coolant fluid during the phase change. The vacuum system provides a system pressure that results in a suitable temperature at which vaporization occurs. The fluid flow is controlled, based upon the demand from the heat load produced. The vacuum system is controlled to maintain the vacuum level. In a second group of embodiments, the electronics are disposed on a coldwall within an enclosure. The expendable liquid is controlled by a flow regulator which feeds the liquid into the enclosure. The expendable liquid is directly heated by the electronics and vaporizes in part within the enclosure. The enclosure is evacuated by a vacuum system which exhausts the vapors produced to the atmosphere while maintaining the desired degree of vacuum within the enclosure. The primary expendable liquids are ammonia, methanol and water.

4 Claims, 9 Drawing Sheets

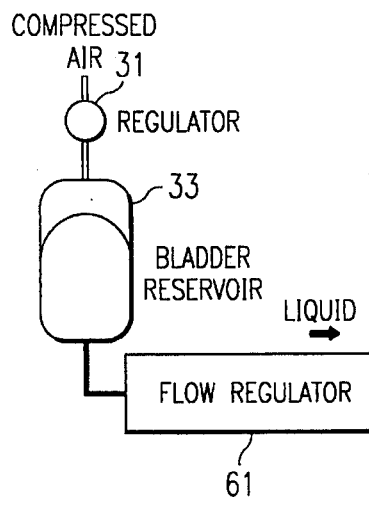
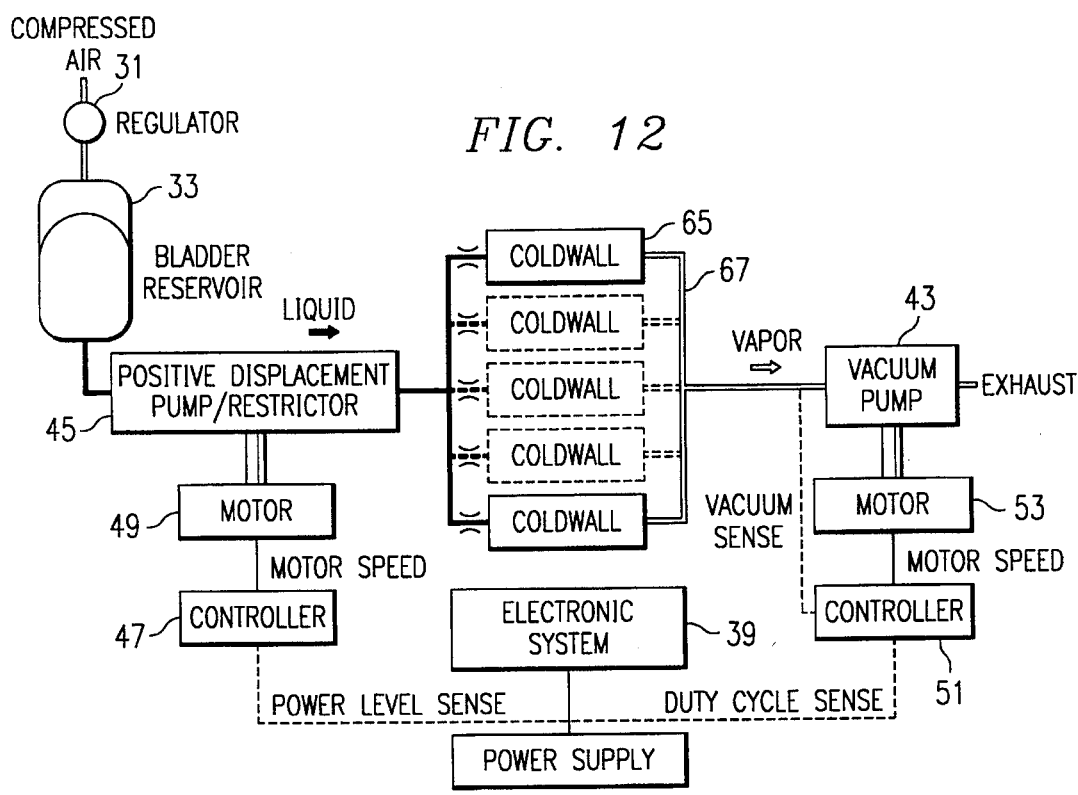
FIG. 11
FIG. 12

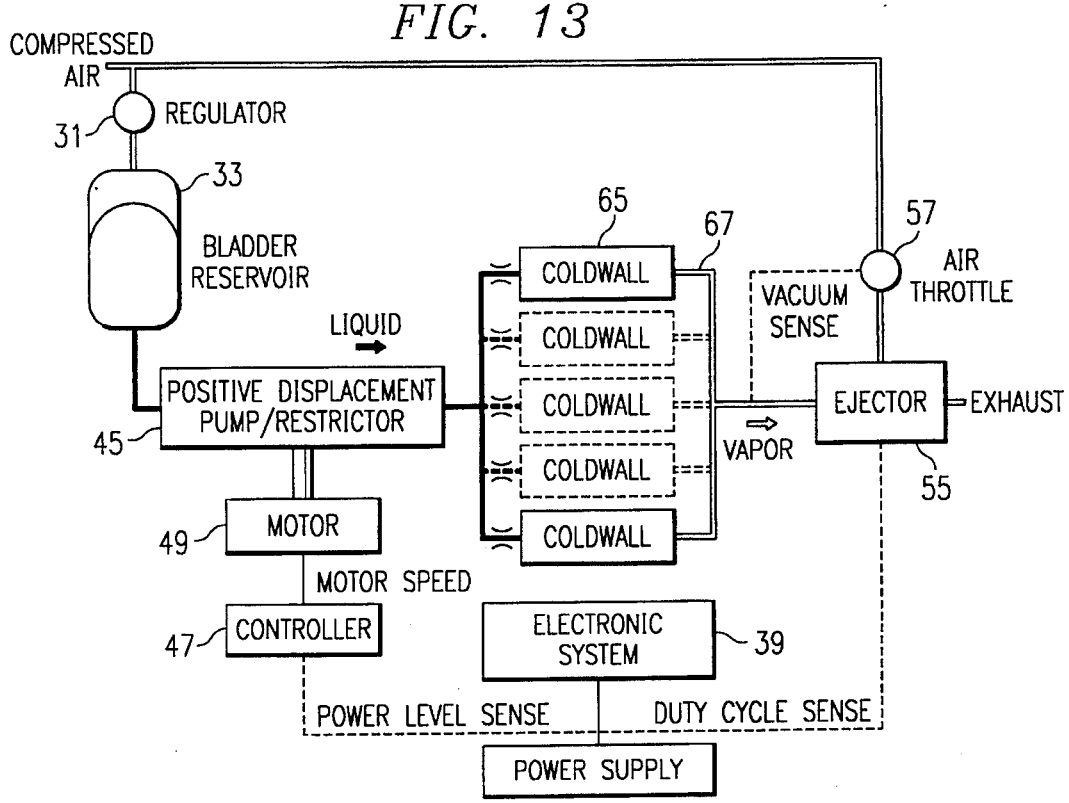
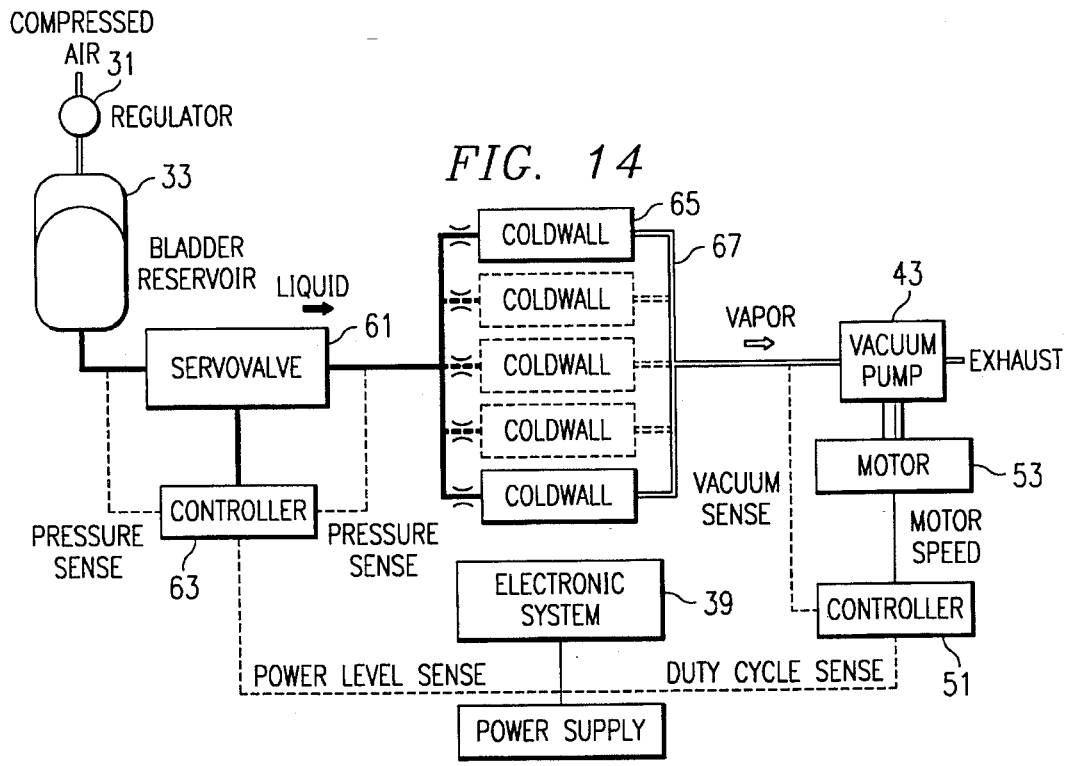

EXPENDABLE LIQUID THERMAL MANAGEMENT SYSTEM

BACKGROUND OF THE INVENTION

1. Field Of The Invention

This invention relates to a thermal management technique upon which a whole new class of aircraft thermal managements systems is based. In addition, this invention provides a means of allowing safe, full heat load, laboratory testing of thermal management systems which use ammonia (or other hazardous liquid) as an expendable liquid.

2. Brief Description Of The Prior Art

Future military aircraft electronic systems currently being developed will produce about three to five times as much waste heat as is produced by currently used electronic systems. As a result, current military aircraft thermal management systems do not have sufficient capacity to handle these expected future waste heat loads. Thermal management systems based upon current technology and methods, which accommodate anticipated heat loads, can be built. However, if these systems were used, more engine bleed air and/or ram air would be required which, in turn, would result in degraded engine and aircraft performance. Since ram air only provides effective cooling at low flight speeds, there is no advantage to having more ram air because that source of cooling can not be used at higher speeds.

Prior art aircraft thermal management systems have used vapor cycle systems. Vapor cycle systems remove electronic system waste heat and reject such heat in three ways. First, waste heat is transferred to the jet fuel on its way to the engine. Second, cool engine bleed air is used to remove heat from the vapor loop. Third, ram air is also used to remove heat from the vapor loop. The capacity of vapor cycle systems is limited by the amount of fuel flow and the amount of bleed air that can be taken from the aircraft engines without degrading aircraft performance. Ram air has an inherent limit because, above a certain aircraft speed, it does not provide any cooling.

Prior art aircraft thermal management systems have also used air cycle systems which use engine bleed air and ram air to remove waste heat. With this type of system, performance is also limited by the amount of bleed air which can be taken from the engine and by ram air availability. With these types of systems, increases in thermal management capacity are not possible without an unacceptable degradation of aircraft performance.

It is therefore apparent that aircraft have a limited cooling capacity and it is therefore necessary to devise a system for cooling avionics equipment either without or with minimal tapping into the aircraft system.

At present, there are several missile thermal management systems under development which use ammonia as an expendable refrigerant. In these systems, waste heat is removed from electronic or other types of assemblies as ammonia boils, changing from liquid to vapor. The vapor is then dumped overboard, carrying with it the waste heat. Although there are other fluids available for use as an expendable refrigerant, they do not have the proper "saturation temperature/pressure" characteristics or have an inadequate latent heat of vaporization to provide the desired temperature control with a system of reasonable weight and size. Laboratory testing of such systems is seen as a safety and implementation problem due to the hazardous nature of ammonia liquid and vapor. Clearly, for these systems to be successful and safely implemented, a means is required to allow safe testing of ammonia based expendable liquid thermal management systems in a production environment.

SUMMARY OF THE INVENTION

In accordance with the present invention, there is provided a totally different approach to aircraft thermal management whereby adequate thermal control of significantly higher heat loads than encountered in the prior art is available without degrading aircraft engine performance. In fact, in some applications, engine performance could improve because less or no bleed air is required. In addition, the present invention can be used in conjunction with the currently used thermal management systems to enhance the capacity of the current thermal management systems or provide capacity to handle peak heat loads.

Briefly, there is provided a thermal management system which uses an expendable liquid which undergoes phase change to a vapor as waste heat is absorbed and which also possesses a high latent heat of vaporization. The resulting vapor is expelled to the atmosphere, carrying with it the waste heat. A unique aspect of the invention is the use of a vacuum source to lower the pressure in the evaporator. Lowering the pressure lowers the temperature at which vaporization occurs. This allows for the use of a liquid or mixture of liquids which have a high latent heat of vaporization but would normally vaporize at a temperature in excess of that desired or which is otherwise not normally operable in the environment to be encountered. Using a vacuum source allows liquids with higher latent heat of vaporization that could otherwise not be used to be used by altering their saturation temperature/pressure characteristics.

For thermal management systems using a hazardous expendable liquid such as ammonia, this invention allows use of a safer fluid, such as methanol, to be used as a substitute during full heat load testing in a laboratory or production environment. In this application, a less hazardous expendable refrigerant is used with a vacuum source to lower the fluid pressure which, in turn, lowers the vaporization temperature of the substitute fluid. By proper control of the vacuum level and correct fluid selection, the substitute can be made to operate with thermal characteristics similar to the fluid it is replacing. With this approach, the system can be tested with near identical thermal performance.

In accordance with a first group of embodiments of the invention, fluid is regulated. The regulated fluid flows into an evaporator/heat exchanger assembly where the pressure is lowered by a vacuum system. Waste heat transported to the evaporator/heat exchanger by the coolant fluid flow loop causes the expendable liquid to boil at a temperature suitable to cool the electronic systems. To ensure maximum efficiency, a flow regulator is used to control the rate of fluid flow from the pressurized reservoir to the evaporator/heat exchanger assembly. With the above described system, the refrigeration effect is produced by the expendable liquid being converted from the liquid phase to the gaseous or vapor phase and absorbing heat from the coolant fluid flow loop during the phase change. The vacuum system is required to provide a system pressure that will result in a suitable saturation temperature at which vaporization will occur. The amount of fluid flow is controlled, based upon the demand from the heat load produced. Also, the vacuum system is controlled in different ways in order to maintain the vacuum level, this being based upon a feedback due to the heat being generated, the vacuum level determining the boiling temperature of the expendable liquid and thereby determining the amount of and rate at which the liquid can absorb the heat.

In accordance with a second group of embodiments, the electronics are disposed on a coldwall which is within an enclosure. The expendable liquid is controlled by a flow regulator which feeds the liquid into the enclosure. However, the expendable liquid itself is directly heated by the electronics and caused to vaporize in part within the enclosure. The enclosure is evacuated by a vacuum system which exhausts the vapors produced to the atmosphere while maintaining the desired degree of vacuum within the enclosure.

The primary candidate expendable liquids for the above described system are ammonia, methanol and water. Although ammonia could be made to operate without the need of a vacuum system, it is not acceptable due to its toxicity and danger to humans except under conditions wherein it will not come in contact with humans when being expended, such as in missile system. This leaves methanol and water as the presently acceptable candidates in most systems. Methanol requires the use of a vacuum system and is a feasible approach. However, water, although it also requires a vacuum system, offers a significant advantage because it has about twice the latent heat of vaporization as methanol. This means that about half the weight of water is required to dissipate the same waste heat energy as methanol. Furthermore, a mixture of these expendable liquids can be used in the event properties unique to each of the liquids used is required. For example, a mixture of water and methanol would provide a liquid with a lower freezing temperature than that of water alone since methanol has a lower freezing temperature than water and would therefore be required in some instances to avoid freezing of the expendable liquid. Accordingly, at present, water is the preferred expendable liquid and methanol, either alone or in combination with water are the known expendable liquids that can be satisfactorily used whereas ammonia can be used in some missile applications either alone or in combination with one or more other appropriate fluids.

An aircraft expendable liquid thermal management system in accordance with the present invention provides a means of removing waste heat from aircraft avionics without using engine bleed and the attendant decrease in engine performance. The system can be a stand-alone thermal management system using no bleed air or ram air or it can be used to augment the cooling capacity of an existing aircraft thermal management system. The refrigeration effect is provided by an expendable liquid which undergoes phase change.

A unique feature of the invention is the use of a vacuum system to lower the temperature at which vaporization of the expendable liquid takes place. Having the ability to lower the vaporization temperature allows seemingly unsuitable liquids to be used. For example, water has the highest latent heat of vaporization, but, without a vacuum system, vaporization takes place at a temperature too high for reliable avionics operation. With the vacuum system, water can be used at a suitable temperature. A suitable vacuum would hold the vapor pressure at 1.3 psia which allows vaporization to take place at 43° C. Similarly, using a vacuum with methanol allows simulation of ammonia in situations where ammonia is used as an expendable refrigerant.

BRIEF DESCRIPTION OF THE DRAWINGS

FIGS. 11 to 15 are schematic diagrams of heat management systems in accordance with a second set of embodiments of the invention.

DESCRIPTION OF THE PREFERRED EMBODIMENTS

Figure 1A:
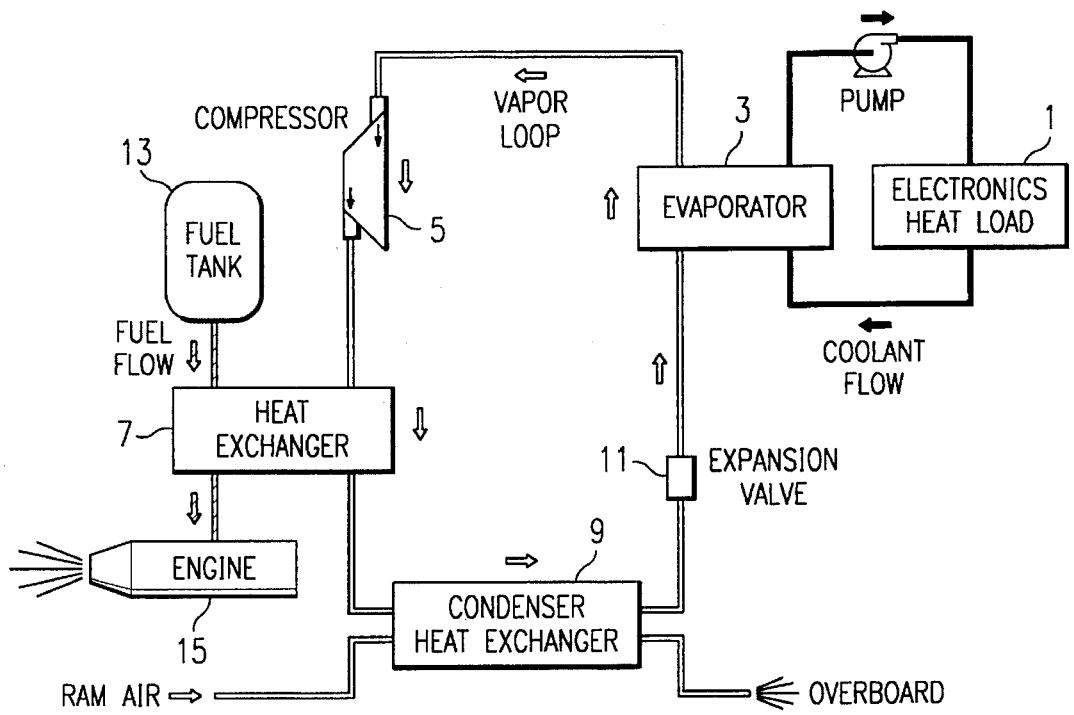
FIGS. 1A to 1C are simplified schematic diagrams of prior art heat management systems used primarily in aircraft.
Figure 1B:
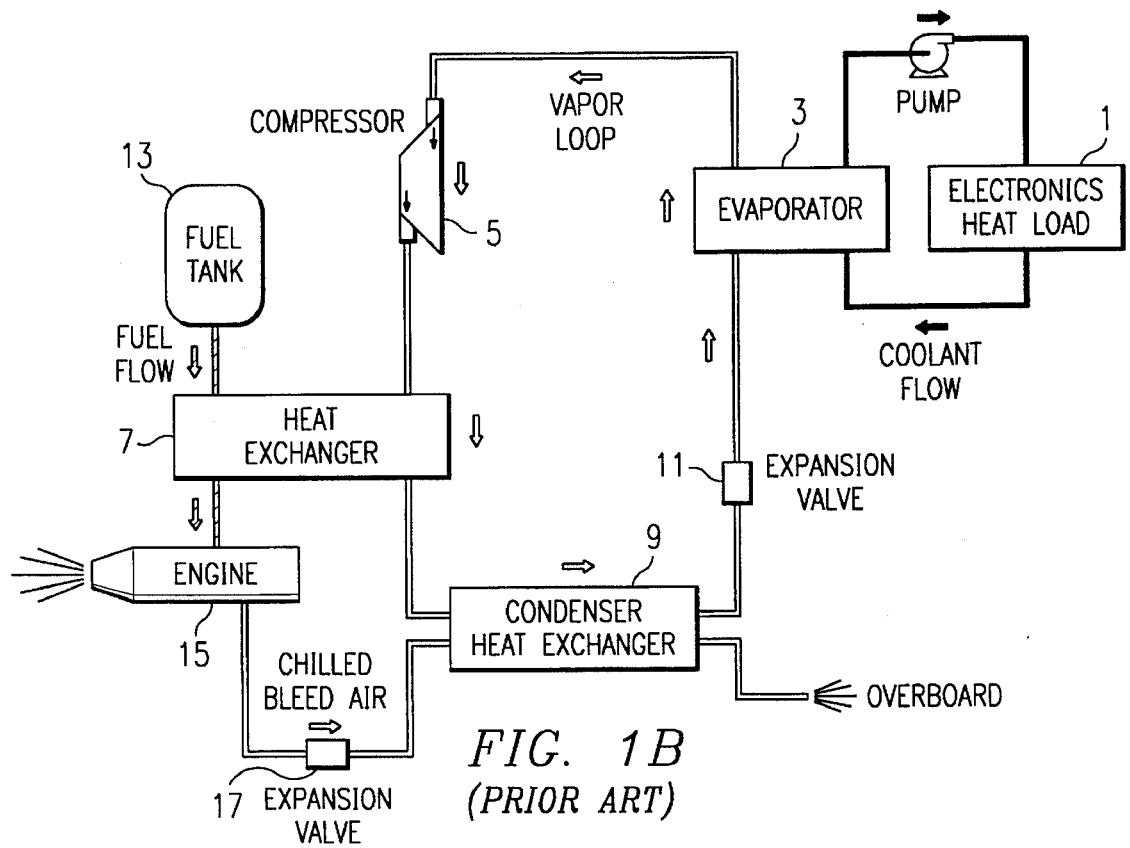
Figure 1C:
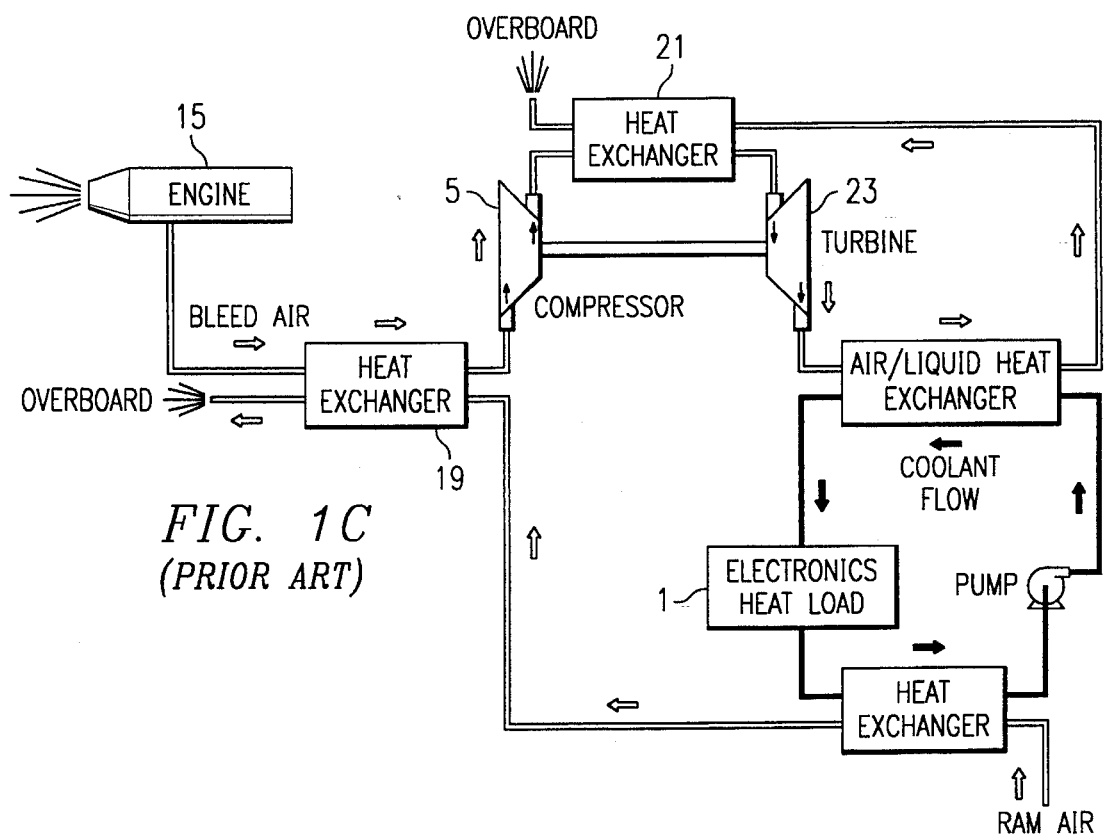

Referring first to FIGS. 1A, 1B and 1C, there are shown simplified schematic diagrams of existing aircraft environmental control systems. These systems are limited by the maximum temperature to which the aircraft fuel can be heated. As can be seen in FIG. 1A, the electronics heat load 1 is cooled by coolant flow fluid which is pumped in a closed loop and passes through an evaporator 3 which removes the heat therefrom. The compressor 5 is part of a second closed loop which compresses the vapor which was formed in the evaporator by heat removal from the coolant flow fluid, into a liquid and passes it through a load heat exchanger 7, a condenser heat exchanger 9 and an expansion valve 11 before returning it to the evaporator. Heat is removed from the compressed liquid by the heat exchanger and transferred to the aircraft fuel 13 being sent to the engine 15 and is also removed by the condenser heat exchanger where it is transferred to ram air which is then expended. The amount of heat that can be transferred to the fuel is limited. There is also a limit to the amount of heat which can be removed by ram air.

The system of FIG. 1B is the same as that of FIG. 1A except that the ram air is replaced chilled bleed air 17 from the aircraft engine which is fed through an expansion valve where the air is expanded to lower pressure and temperature and then to the condenser heat exchanger.

The system of FIG. 1C is utilizes bleed air from the aircraft engine which is cooled in a heat exchanger 19 and compressed in a compressor. The air is again cooled in a second heat exchanger 21 and run through a turbine 23 where it is expanded and cooled further. This cool air then cools the liquid loop containing the electronics, this air also being used in the second heat exchanger to provide the cooling before being expelled. All of the systems of FIGS. 1A, 1B and 1C have a limited cooling capacity.

Figure 2:
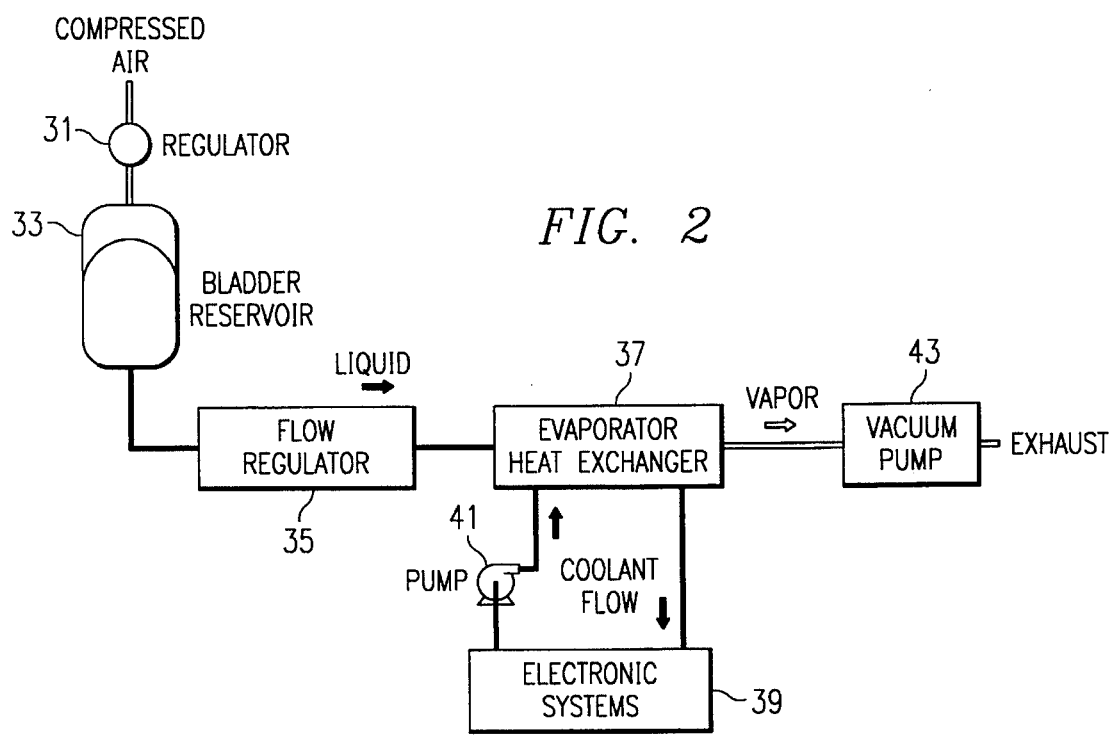
FIGS. 2 to 10 are schematic diagrams of heat management systems in accordance with a first set of embodiments of the invention.

Referring now to FIG. 2, there is shown a very basic system in accordance with the present invention. The system includes a regulator 31 which regulates the pressure within a bladder reservoir 33 containing the expendable liquid. This is accomplished by injecting compressed air into the reservoir to maintain the desired pressure therein. The flow rate of the expendable liquid is controlled by a flow regulator 35 from the bladder reservoir to the demand required by the heat load. The expendable liquid travels to an evaporator heat exchanger 37 where it is brought to a boil by a conduit containing heated coolant flow fluid and partially vaporizes, meanwhile extracting heat and cooling the cooling flow fluid. The cooling flow fluid is that fluid which in fact cools down the electronic system 39, this cooling fluid being pumped by a pump 41 along a continuous closed path including the evaporator heat exchanger, the electronic system and the pump. The expendable fluid vaporized in the evaporator heat exchanger is then exhausted to the atmosphere by a vacuum system 43 which maintains a predetermined partial vacuum in the heat exchanger.

Figure 3:
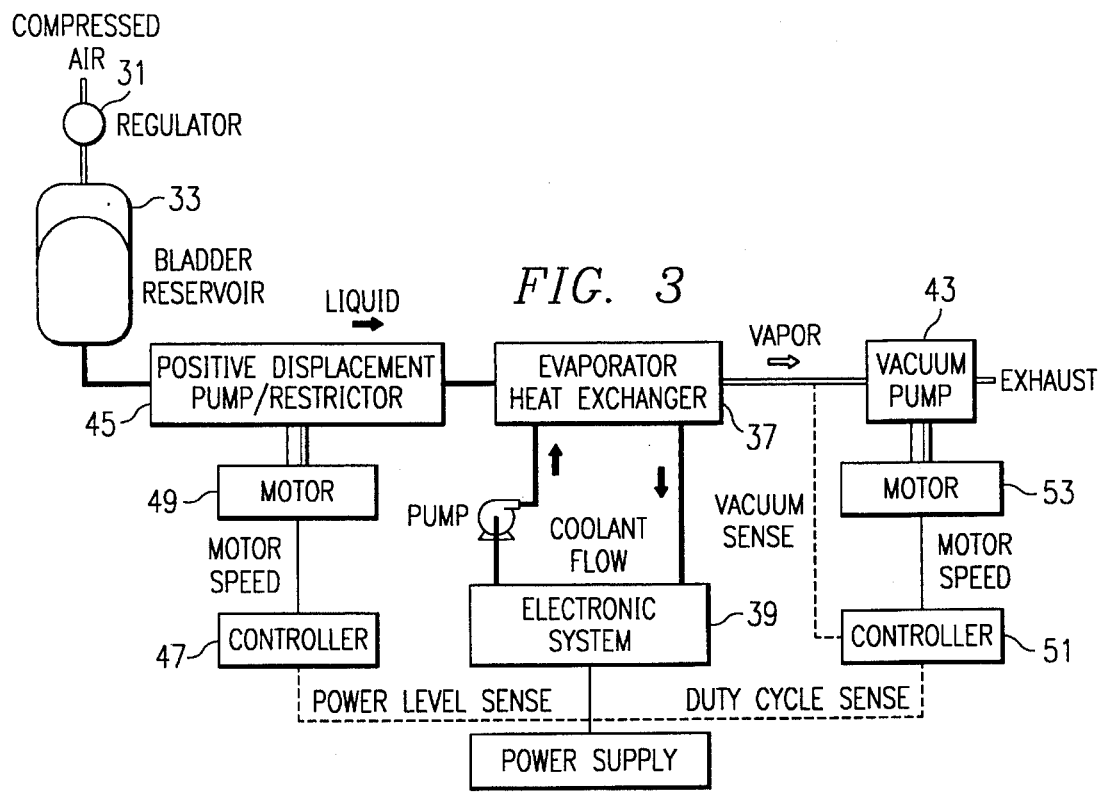

Referring to FIG. 3, there is shown a first embodiment in accordance with the present invention. There is shown a regulator which regulates the pressure within a bladder reservoir containing the expendable liquid. This is accomplished by injecting compressed air into the reservoir to maintain the desired pressure therein. In some cases, the regulator is not required and the bladder reservoir can be nothing more than a bucket of liquid which gravity feeds liquid to the system. A positive displacement pump/restrictor 45 adjusts the flow rate of the liquid from the bladder reservoir to the demand required by the heat load. This is controlled by a feedback signal which is provided by a pump/restrictor controller 47 operating in response to a sensed power level signal, to be described hereinbelow. The pump/restrictor controller controls the speed of a pump/restrictor motor 49 which controls the volume of fluid pumped. The expendable liquid travels to an evaporator heat exchanger where it is brought to a boil by a conduit containing heated coolant flow fluid and partially vaporizes, meanwhile extracting heat and cooling the cooling flow fluid. The cooling flow fluid is that fluid which in fact cools down the electronic system, this cooling fluid being pumped by a pump along a continuous closed path including the evaporator heat exchanger, the electronic system and the pump.

The expendable fluid vaporized in the evaporator heat exchanger is then exhausted to the atmosphere by a vacuum pump which maintains a predetermined partial vacuum in the heat exchanger. A fixed level of vacuum is maintained in the heat exchanger. This is accomplished by sensing the degree of vacuum at the output of the heat exchanger and providing an indication thereof at a vacuum controller 51. The vacuum controller then controls the speed of a vacuum pump motor 53 which, in turn, controls the vacuum pump.

It can be seen that the degree of vacuum at the evaporator heat exchanger determines the boiling point of the expendable liquid. As the boiling point of the expendable liquid changes, so does the amount of heat extracted from the coolant flow fluid change. As the heat extracted from the coolant flow fluid changes, so does the temperature of the electronic system change. Accordingly, the temperature of the electronic system can be adjusted by adjusting the operation of the vacuum pump under control of, the vacuum controller. Also, the vacuum pump controller can be responsive to the temperature of the electronic system since that temperature is directly related to the amount of vacuum in the heat exchanger. Furthermore, the amount of expendable liquid fed to the heat exchanger is related to the amount of vapor produced in the heat exchanger. The amount of vapor produced in the heat exchanger is related to the amount of cooling of the coolant flow fluid and the temperature of the electronic system is related to the amount of cooling of the coolant flow fluid. It follows that the restrictor controller can be responsive to the temperature of the electronic system. Furthermore, in order to insure uniformity of temperature of the coolant flow fluid, it is necessary to insure that the expendable fluid is not completely vaporized in the heat exchanger and that some liquid is always present. This is accomplished by having the rate of fluid flow from the pump/restrictor slightly higher than that dictated by the imposed heat load. The desired flow rate is determined by the pump/restrictor controller using a feedback signal to set the pump speed of the pump/restrictor. It can be seen that the vacuum pump operates to maintain a vacuum in some predetermined range in the heat exchanger as a result of the controlled vaporization under controlled vacuum and exhaustion of an expendable fluid having a high latent heat of vaporization.

Figure 4:
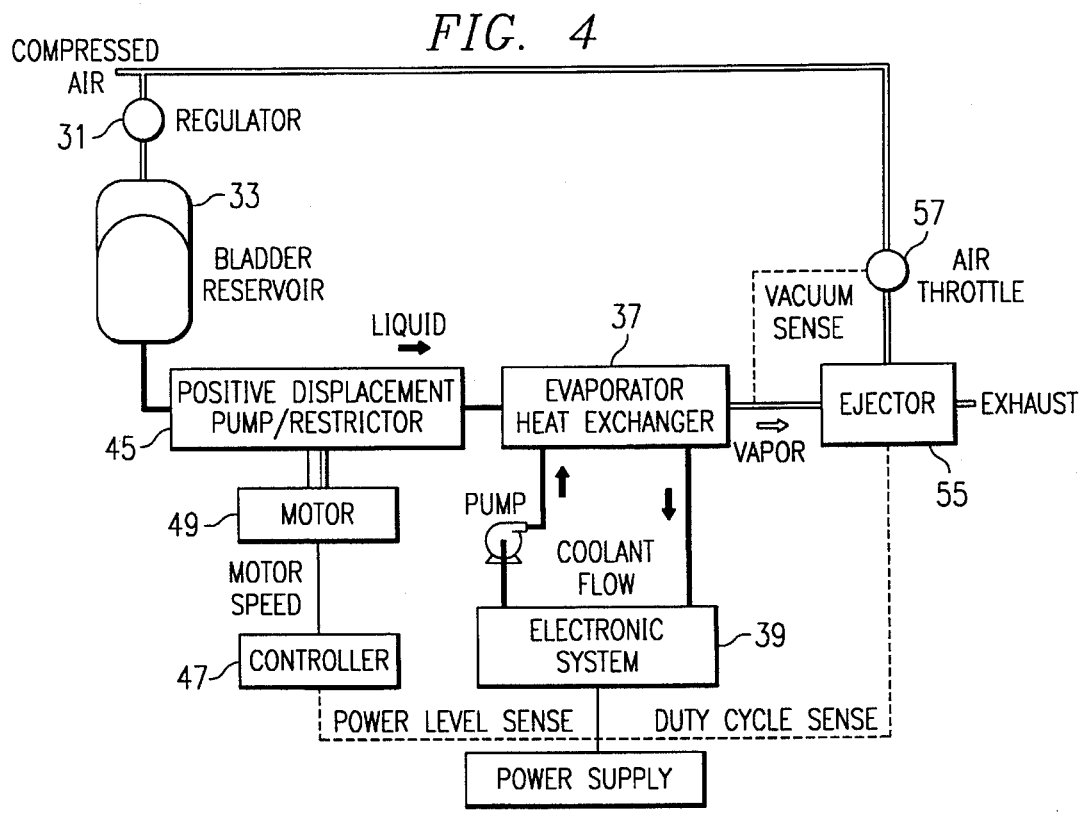

Referring now to FIG. 4, there is shown a system similar to that of FIG. 3 except that the vacuum is provided in a different manner. In the embodiment of FIG. 4, the vacuum pump and associated motor and controller are replaced by an ejector 55 wherein compressed air is fed to an air throttle 57 and air from the air throttle, which is controlled by the amount of vacuum in the heat exchanger, flows over a nozzle in the ejector to create the vacuum in known manner. The ejector is a primary stream of air at a high pressure which runs through a nozzle and creates a very high velocity. That velocity aspirates air in the secondary stream. Ejectors are well known in the art and need no further discussion herein.

Figure 5:
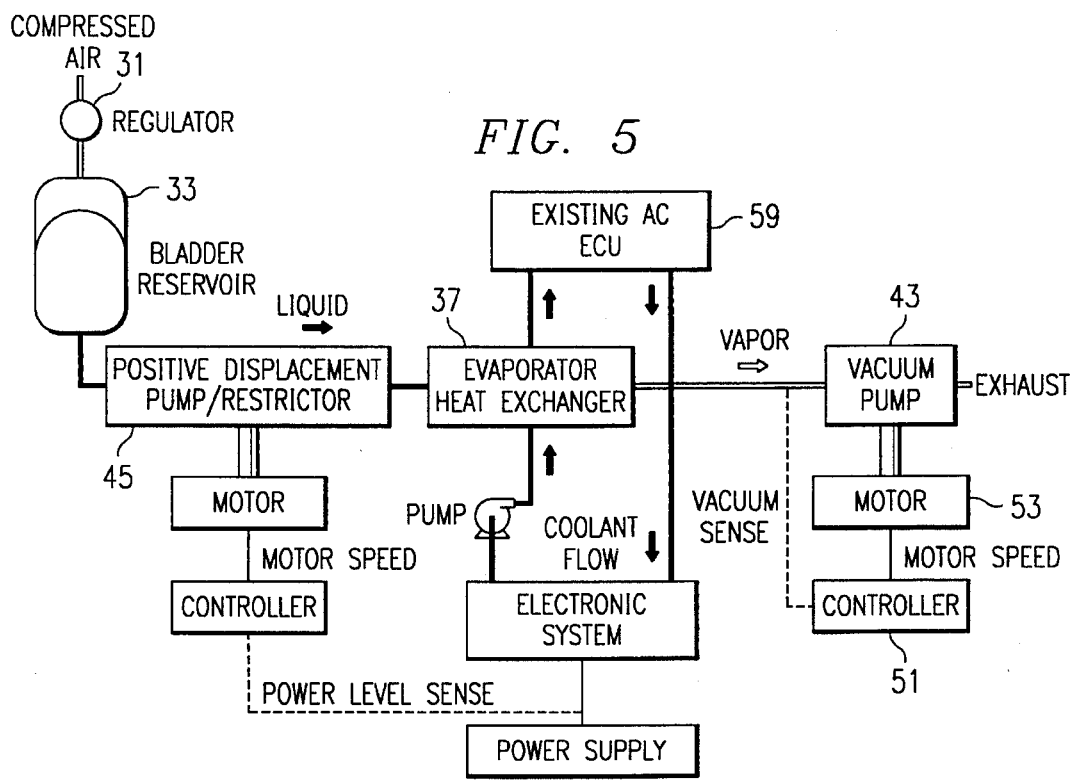

The embodiment of FIG. 5 is the same as the embodiment of FIG. 3 except that advantage is being taken of an existing cooling system 59 already available to provide some of the required cooling. It follows that some of the total cooling of the coolant flow liquid is provided as discuss with reference to FIG. 3 and some of the coolant flow fluid is diverted to the existing cooling system and returned to the electronic system cooling loop.

Figure 6:
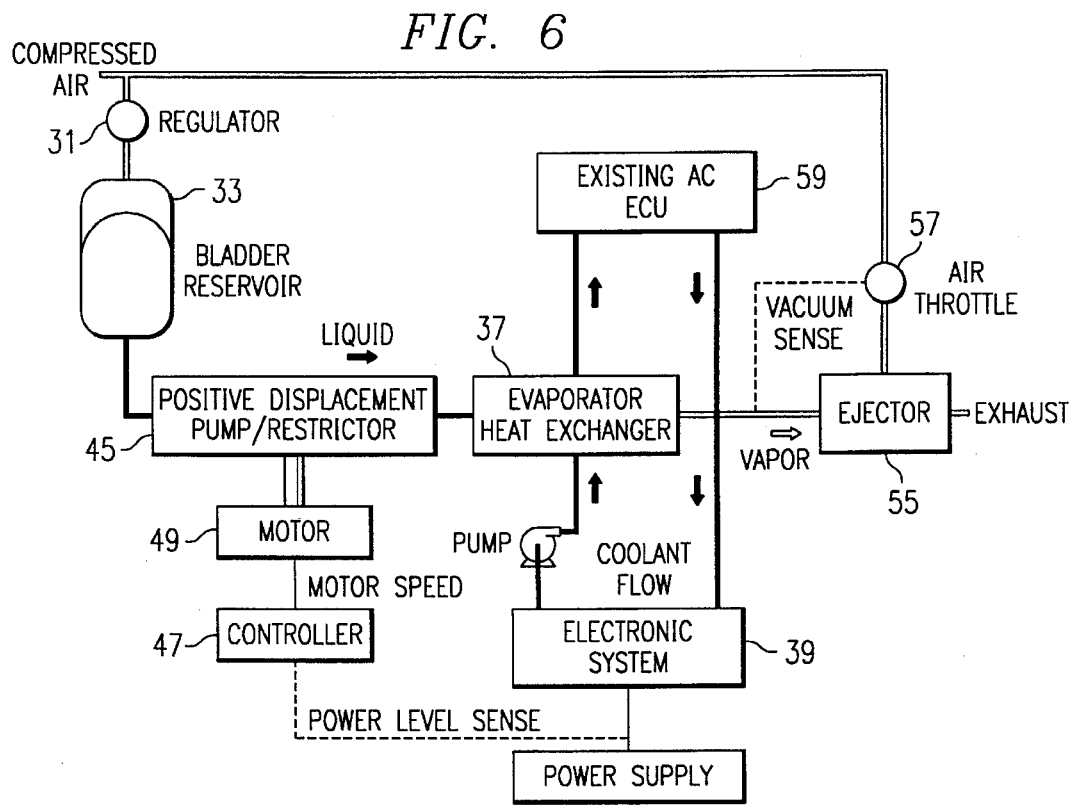

The embodiment of FIG. 6 is similar to the embodiment of FIG. 5 except that the vacuum pump and associated motor and controller are replace by the ejector and air throttle of FIG. 4.

Figure 7:
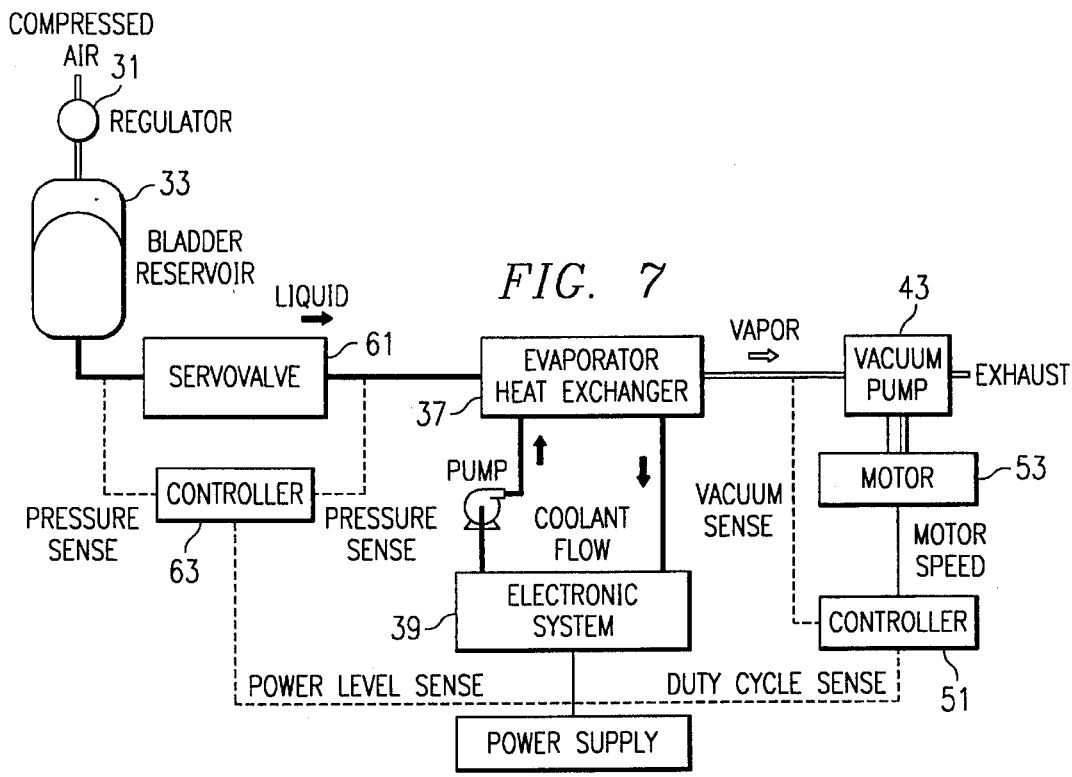

The embodiment of FIG. 7 is similar to the embodiment of FIG. 1 except that the positive displacement pump/restrictor and associated motor are replace by a servovalve 61. The controller 63 senses the pressure on both sides of the servovalve to set the displacement of the spool in the servovalve to regulate liquid flow.

Figure 8:
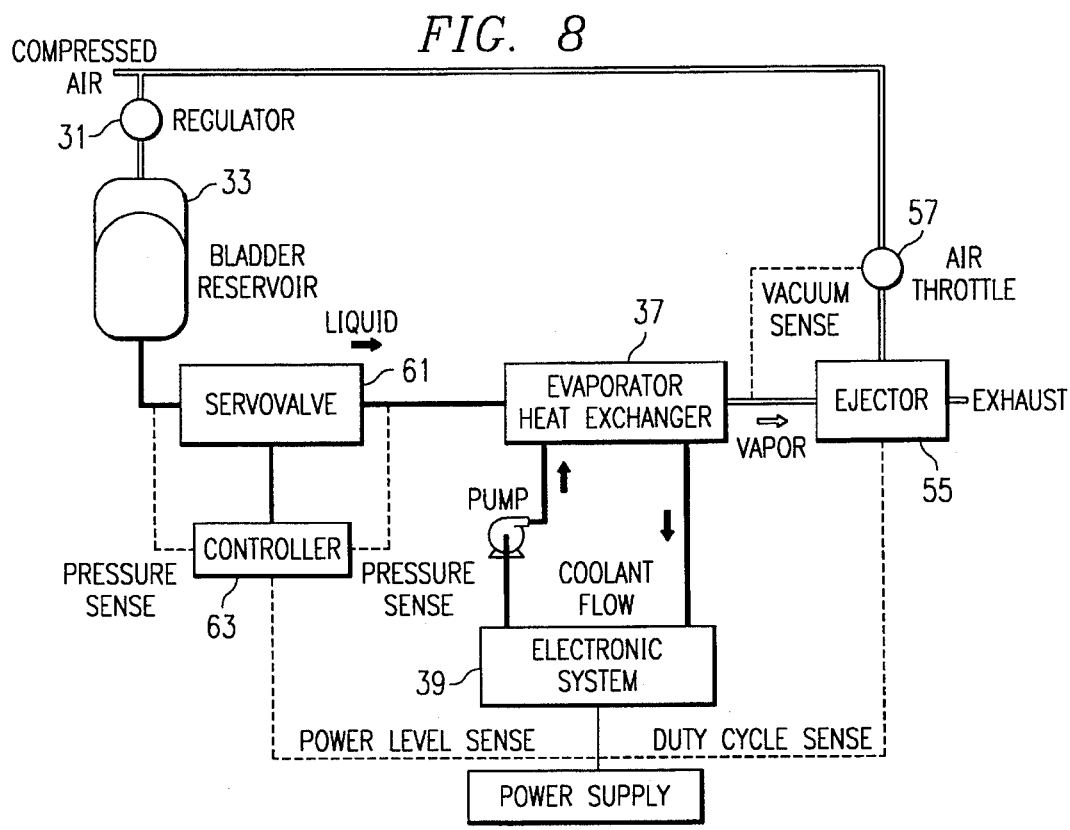
Figure 9:
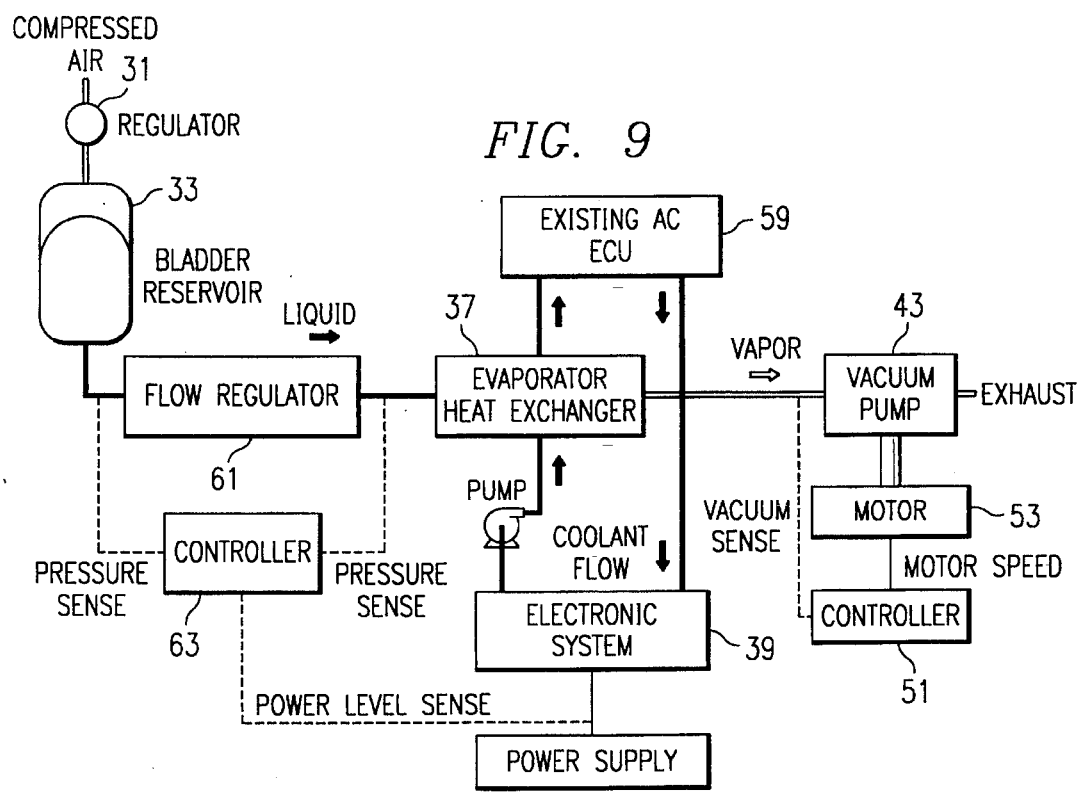
Figure 10:
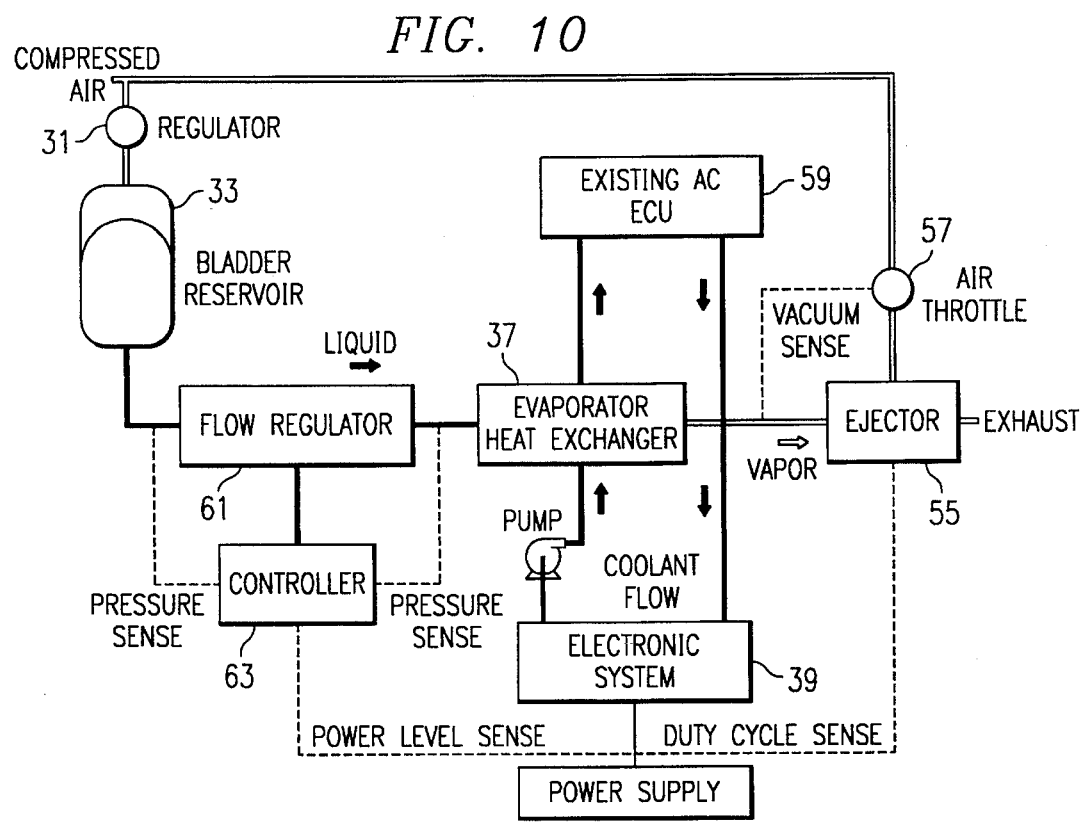
Figure 15:
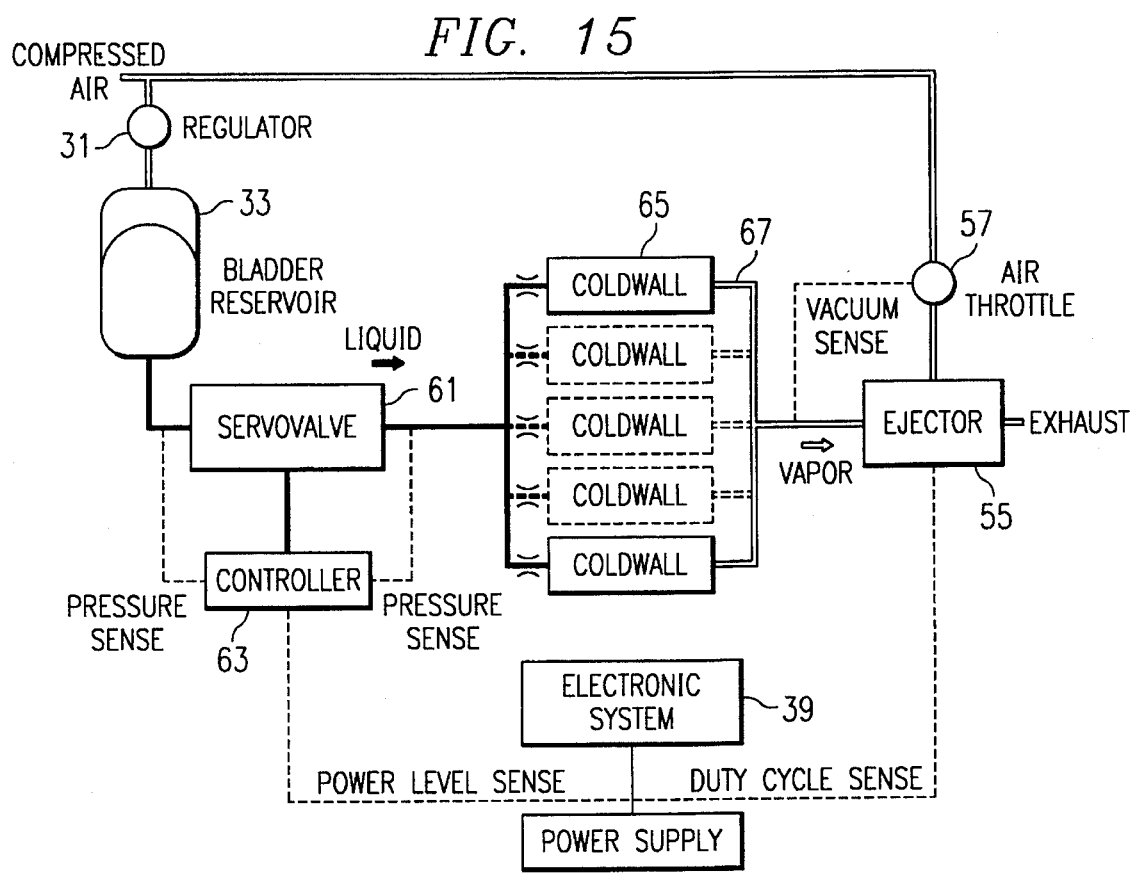

The embodiment of FIG. 8 is the same as the embodiment of FIG. 4, the embodiment of FIG. 9 is the same as the embodiment of FIG. 5 and the embodiment of FIG. 10 is the same as the embodiment of FIG. 6 except that the positive displacement pump in each is replaced by the servovalve 61 described above with reference to FIG. 7.

The embodiment of FIG. 11 provides the vaporization of the expendable fluid at the electronic system to be cooled and provides the cooling thereof directly. This system utilizes the same regulator, bladder reservoir and flow regulator as described in the above embodiments. However, the electronic components are mounted on coldwalls 65 and the vaporization of the expendable liquid takes place in the enclosed region 67 containing the coldwalls with electronics mounted thereon. The heat is removed from the electronic components by the vaporization of the expendable fluid, the fluid being maintained under partial vacuum in the enclosed region containing the coldwalls by a vacuum system as described above. The expendable fluid in vapor form is then expelled.

The embodiments of FIGS. 12 to 15 are the same as the embodiment of FIG. 11 except that the flow regulator and the vacuum system are replaced by the equivalent structures described with reference to the embodiments of FIGS. 3 to 5 respectively.

Though the invention has been described with respect to specific preferred embodiments thereof, many variations and modifications will immediately become apparent to those skilled in the art. It is therefore the intention that the appended claims be interpreted as broadly as possible to include as such variations and modifications.

We claim:

1. A thermal management system for heat removal which comprises:

(a) a source of expendable liquid;

(b) a heat exchanger;

(c) a feed control system for feeding said expendable liquid to said heat exchanger at a controlled rate; and (d) a vacuum control system for maintaining a controlled vacuum in said heat exchanger by expelling vapors of said expendable liquid formed in said heat exchanger from said heat exchanger comprising a vacuum pump, a first motor controlling said vacuum pump and a first motor controller responsive to a predetermined parameter associated with said heat exchanger to control the speed of said first motor.

2. The system of claim 1 wherein said feed control system comprises a positive displacement pump/restrictor, a second motor controlling said pump/restrictor and a second controller responsive to a predetermined parameter to control the speed of said second motor.

3. A method of thermal management for heat removal which comprises the steps of:

(a) providing a source of expendable liquid;

(b) providing a heat exchanger;

(c) feeding said source of expendable liquid to said heat exchanger at a controlled rate to vaporize said liquid in said heat exchanger; and (d) maintaining a controlled vacuum in said heat exchanger by expelling the vapors of said expendable fluid from said heat exchanger wherein said vacuum control system comprises a vacuum pump, a first motor controlling said vacuum pump and a first motor controller responsive to a predetermined parameter associated with said heat exchanger to control the speed of said first motor.

4. The method of claim 3 wherein said feed control system comprises a positive displacement pump/restrictor, a second motor controlling said pump/restrictor and a second controller responsive to a predetermined parameter to control the speed of said second motor.

* * * * *